United States Patent
Dalis

(10) Patent No.: US 7,236,352 B2
(45) Date of Patent: Jun. 26, 2007

(54) ARC RESISTANT SWITCHGEAR HAVING DEDICATED VERTICAL PLENUMS

(75) Inventor: Mandell Dalis, Sands Point, NY (US)

(73) Assignee: Pacs Industries, Inc., Great Neck, NY (US)

( * ) Notice: Subject to any disclaimer, the term of this patent is extended or adjusted under 35 U.S.C. 154(b) by 29 days.

(21) Appl. No.: 11/032,962

(22) Filed: Jan. 11, 2005

(65) Prior Publication Data
US 2006/0152889 A1    Jul. 13, 2006

(51) Int. Cl.
*H05K 7/20* (2006.01)
(52) U.S. Cl. .................. 361/608; 361/605; 361/676; 361/678; 218/157; 200/306; 174/17 VA
(58) Field of Classification Search ................ 361/605, 361/611, 619–621, 623–626, 675–679, 688–695; 312/236; 200/50.21–50.27, 306; 218/155, 218/157; 220/3.2, 3.5; 454/184
See application file for complete search history.

(56) References Cited

U.S. PATENT DOCUMENTS

| | | | | | |
|---|---|---|---|---|---|
| 4,528,614 | A | * | 7/1985 | Shariff et al. | 361/678 |
| 5,193,049 | A | * | 3/1993 | Jackson | 361/676 |
| 5,457,296 | A | * | 10/1995 | Neill et al. | 200/306 |
| 5,574,624 | A | * | 11/1996 | Rennie et al. | 361/676 |
| 5,710,402 | A | * | 1/1998 | Karnbach et al. | 218/157 |
| 5,892,195 | A | * | 4/1999 | Aufermann et al. | 218/157 |
| 6,407,331 | B1 | * | 6/2002 | Smith et al. | 174/50 |
| 6,417,443 | B1 | * | 7/2002 | Smith | 174/17 VA |
| 7,054,143 | B2 | * | 5/2006 | Eiselt et al. | 361/605 |

FOREIGN PATENT DOCUMENTS

DE            04220790 A1 * 1/1994

* cited by examiner

*Primary Examiner*—Michael Datskovskiy
(74) *Attorney, Agent, or Firm*—Kremblas, Foster, Phillips & Pollick; Patrick P. Phillips

(57) ABSTRACT

An arc resistant switchgear assembly is provided having a front wall, a rear wall, a bottom surface, an upper surface, a first side wall, and a second side wall opposed to the first side wall and spaced a first distance from the first side wall, with each of the first and second side walls having an upper portion and a lower portion, and with each of the first and second side walls having an inner and an outer surface, with at least the lower portion of both the first side wall and the second side wall having at least one blow-off panel detachably secured thereto by fastening means. Each of the panels is detachably secured to the outer surface of the side wall to which each is secured. The assembly has a vertical plenum formed directly adjacent both the first and the second side walls, with the outer surface of each of the first and second side walls defining an inner side wall of each of the vertical plenums. The outer surface of the first side wall defines the inner side wall of one of the vertical plenums and the outer surface of the second side wall defines the inner side wall of an adjacent vertical plenum.

17 Claims, 4 Drawing Sheets

ARC RESISTANT SWITCHGEAR HAVING DEDICATED VERTICAL PLENUMS

BACKGROUND OF THE INVENTION

1. Field of the Invention

The present invention relates generally to electrical switchgear, and more particularly to arc resistant switchgear, and even more particularly to arc resistant switchgear that features dedicated vertical plenums.

2. Description of the Related Art

This invention is directed to the providing of arc resistant switchgear featuring a dedicated vertical plenum for each vertical switchgear cubicle. Arc resistant switchgear is electrical equipment designed to withstand the effects of an internal arcing fault. The occurrence of arcing inside electrical switchgear has many undesirable results. The arc energy can cause a sudden pressure increase inside the enclosure resulting in severe mechanical and thermal stress on the equipment, particularly the door.

The arc itself can be caused by a bad breaker, the presence inside the switchgear of a small animal, bad insulation, or even lightning. As arcing begins, the gases inside the switchgear ionize. This ionization reduces the ability of the air inside the switchgear to provide its previous insulative capabilities, and in fact the ions generated by the degradation of the air molecules inside the switchgear causes the air to more readily conduct electricity. Consequently, any given arc tries to get more paths to ground. Further, the existence of an arc results in the temperature of the air in the enclosure rising quickly due to the high level of heat energy, since the temperature of the arc alone is can be 10,000-20,000° F.

As the gases expand rapidly, there is a rapid build-up in pressure. The combination of the rapid build-up in heat and the rapid build-up in pressure can result in an explosion with a shockwave that can measure Mach 2. If an individual is nearby the unit where the arcing occurs, they can be seriously injured, if not killed. There have been instances where the hot gases alone have been responsible for igniting the clothing of nearby workers, since the exhaust temperature alone can reach 2000° F.

At the very least, in an explosion due to arcing occurring inside switchgear, substantial material damage can occur, resulting in significant economic loss due to the interruption of energy distribution not to mention the destruction of the switchgear itself. This material damage can be to the door itself, or it can also involve the destruction of parts from within the switchgear unit, or burn through of the metal cubicles housing the switchgear unit. While one might think that all of the aforementioned process takes a considerable time to fully develop, in actuality the compression of the gas within the enclosed space due to the increase in pressure due to arcing, and the subsequent expansion of the gas as described above can all occur between 5-15 milliseconds.

Prior art electrical switchgear typically utilizes two main orientations of cubicles. In the one type of orientation, a vertical section of electrical components, typically breakers, separate two pairs of compartments, each pair of compartments having an upper cubicle and a lower cubicle, with the front pair of cubicles having doors facing the front of the switchgear unit, and with the rear pair of cubicles having doors facing the rear of the switchgear unit. In the event of an explosion, the exhaust theoretically exits from the affected cubicles through a vent or panel located in the top ceiling of each cubicle needing to be vented, with the exhaust passing into the room where the switchgear is located. In actuality, the door is typically forced open due to the force of the explosion and/or the metal housing of the cubicle can burn through.

In another type of prior art orientation of the cubicles, an internal horizontal plenum or passageway runs through a number of directly adjacent vertical pairs of upper and lower cubicles, with the upper cubicles often being vented by the type of vent discussed in the preceding paragraph. In addition, the cubicles underneath the internal horizontal plenum each have a vent located in their top ceiling, such that if an explosion occurs, the exhaust is forced upwardly into the internal horizontal plenum, and then ultimately discharged over the top of the switchgear typically into the air of the room where the switchgear is located. In switchgear having vents only in the ceiling, or in a combination of an internal horizontal plenum and ceiling vents, typically at least an 8' vertical clearance between the top of the cubicle and the ceiling of the room where the switchgear is located must be maintained due to the force of any blast exhaust.

While it is apparent that the problem associated with arcing in electric switchgear has been recognized, it is also readily apparent that the need continues to exist for arc resistant switchgear. Attempts have focused on lessening the chance of an arc occurring, but when one occurs, the only way to minimize it is by quickly providing for the safe exhaust of the hot gases. Existing methods have not adequately solved the problem.

SUMMARY OF THE INVENTION

In accordance with this invention an arc resistant switchgear assembly is provided having a front wall, a rear wall, a bottom surface, an upper surface, a first side wall, and a second side wall opposed to the first side wall and spaced a first distance from the first side wall, each of the first and second side walls having an upper portion and a lower portion, and each of the first and second side walls having an inner and an outer surface, with at least the lower portion of one side wall having a blow-off panel detachably secured thereto by fastening means. The aforementioned blow-off panel is detachably secured to the outer surface of the one side wall. The assembly has a vertical plenum formed directly adjacent the one side wall, with the outer surface of that one side wall defining the inner side wall of the vertical plenum. The vertical plenum extends upwardly and connects to a common horizontal collector plenum that is located above and extends across the switchgear's roof. The vertical plenum is of a width less than the first distance.

The fasteners for detachably securing the blow-off plates to the side wall are non-metallic, and preferably are nylon. In the preferred embodiment, the front wall, rear wall, first and second side walls, bottom surface and upper surface are of metal. The upper surface has at least one relief flap resting thereon, with the upper surface relief flap being hingedly connected to the upper surface.

The switchgear assembly also includes a blow-off panel support shelf, with a shelf being secured to the outer surface of the one side wall below and adjacent to a blow-off panel, such that the blow-off panel is in contacting relationship with the blow-off panel support shelf. The horizontal collector plenum is connected to ductwork which terminates outside the building where the switchgear assembly is located. The switchgear assembly also includes a service hand-hole located above the blow-off panel, with the service hand-hole having a service aperture and a service panel. The service panel is secured to the inner surface of the one side wall.

Preferably, at least the lower portion of both the first side wall and the second side wall has at least one blow-off panel detachably secured thereto by fastening means, with each of the panels being detachably secured to the outer surface of the side wall to which each is secured, such that the assembly has a vertical plenum formed directly adjacent both the first and second side walls. The outer surface of each of the first and second side walls defines an inner side wall of each of the vertical plenums.

In the switchgear assembly, the vertical plenum has a width in the range of 4-18", and more preferably in the range of 6-10". Once again, the fasteners for detachably securing the blow-off plates to the side wall are non-metallic, and preferably are nylon. The upper surface has at least one relief flap resting thereon, with the upper surface relief flap being hingedly connected to the upper surface. The horizontal collector plenum is preferably of a height that is greater than the width of the vertical plenum, with that height being approximately 2'.

The switchgear assembly described in the previous paragraph also includes blow-off panel support shelves, with a support shelf being secured to the outer surface of the first side wall and with a support shelf also being secured to the second side wall below, the shelves being adjacent to the blow-off panels, with each blow-off panel in contacting relationship with the blow-off panel support shelf adjacent thereto.

The assembly also preferably includes a service hand-hole located above each of the blow-off panels, with each service hand-hole having a service aperture and a service panel. Each service panel is secured to the inner surface of the side wall to which the blow-off panel below it is attached.

There is also disclosed an arc resistant switchgear assembly having a front wall, a rear wall, a bottom surface, an upper surface, a first side wall, and a second side wall opposed to the first side wall and spaced a first distance from the first side wall, with each of the first and second side walls having an upper portion and a lower portion, and with each of the first and second side walls having an inner and an outer surface, with at least the lower portion of both the first side wall and the second side wall having at least one blow-off panel detachably secured thereto by fastening means.

Each of the panels is detachably secured to the outer surface of the side wall to which each is secured. The assembly has a vertical plenum formed directly adjacent both the first and the second side walls, with the outer surface of each of the first and second side walls defining an inner side wall of each of the vertical plenums. The outer surface of the first side wall defines the inner side wall of one of the vertical plenums and the outer surface of the second side wall defines the inner side wall of an adjacent vertical plenum, with each of the vertical plenums extending upwardly and connecting to a horizontal collector plenum, which is then connected to ductwork or other exhaust conduit for discharge out of the room where the switchgear utilizing this invention is located. Each vertical plenum is of a width less than the first distance referenced above.

There is also disclosed an arc resistant switchgear assembly having a plurality of compartments at least two high and at least two deep, with the assembly having a front wall directly adjacent two of the compartments and having a rear wall directly adjacent another two of the compartments, a first side wall being directly adjacent at least four compartments and a second side wall spaced a first distance from and in opposed relationship to the first side wall and also being directly adjacent at least four compartments. Each of the first and second side walls has an upper portion and a lower portion, as well as an inner and an outer surface, with at least the lower portion of both the first side wall and the second side wall having at least one blow-off panel detachably secured thereto by fastening means, with each of the panels being detachably secured to the outer surface of the side wall to which each is secured.

The assembly thus has a vertical plenum formed directly adjacent both the first and second side walls, with the outer surface of the first side wall defining the inner side wall of one of the vertical plenums and the outer surface of the second side wall defining the inner side wall of an adjacent vertical plenum, with each of the vertical plenums extending upwardly and connecting to a horizontal collector plenum, and with each vertical plenum being of a width less than the first distance.

A service hand-hole is preferably located above each of the blow-off panels, with each service hand-hole having a service aperture and a service panel. Each service panel is secured to the inner surface of the side wall to which the blow-off panel is attached. One embodiment of the switchgear assembly includes a series of vertical plenums, each vertical plenum being separated by a set of a plurality of compartments at least two high and at least two deep, such that the assembly has a plurality of sets of compartments.

The primary objective of this invention is to provide switchgear that can quickly dissipate the exhaust from an explosion due to electrical arcing within a switchgear assembly without possibly spreading the explosive detritus, smoke, or airborne chemicals to adjacent vertical cubicles as can occur in switchgear having an internal horizontal common plenum. An important aspect of this feature is the ability to quickly lower the pressure within the switchgear assembly should an unforeseen explosion occur.

Another objective is to provide arc resistant that is of relatively economical construction and is relatively easy to fabricate. An important aspect of this feature is that the equipment fit in an area that maximizes kilowatt output per square foot.

Still another objective is to provide arc resistant switchgear that is relatively cheap to initially install and maintain. An important aspect of this feature is the ability to be able to reuse the switchgear in adjacent cubicles to where an explosion occurs, and to more easily reuse the switchgear housing itself following an explosion.

Other objects and advantages of the invention will be apparent from the following description, the accompanying drawings, and the appended claims.

Figure 1:
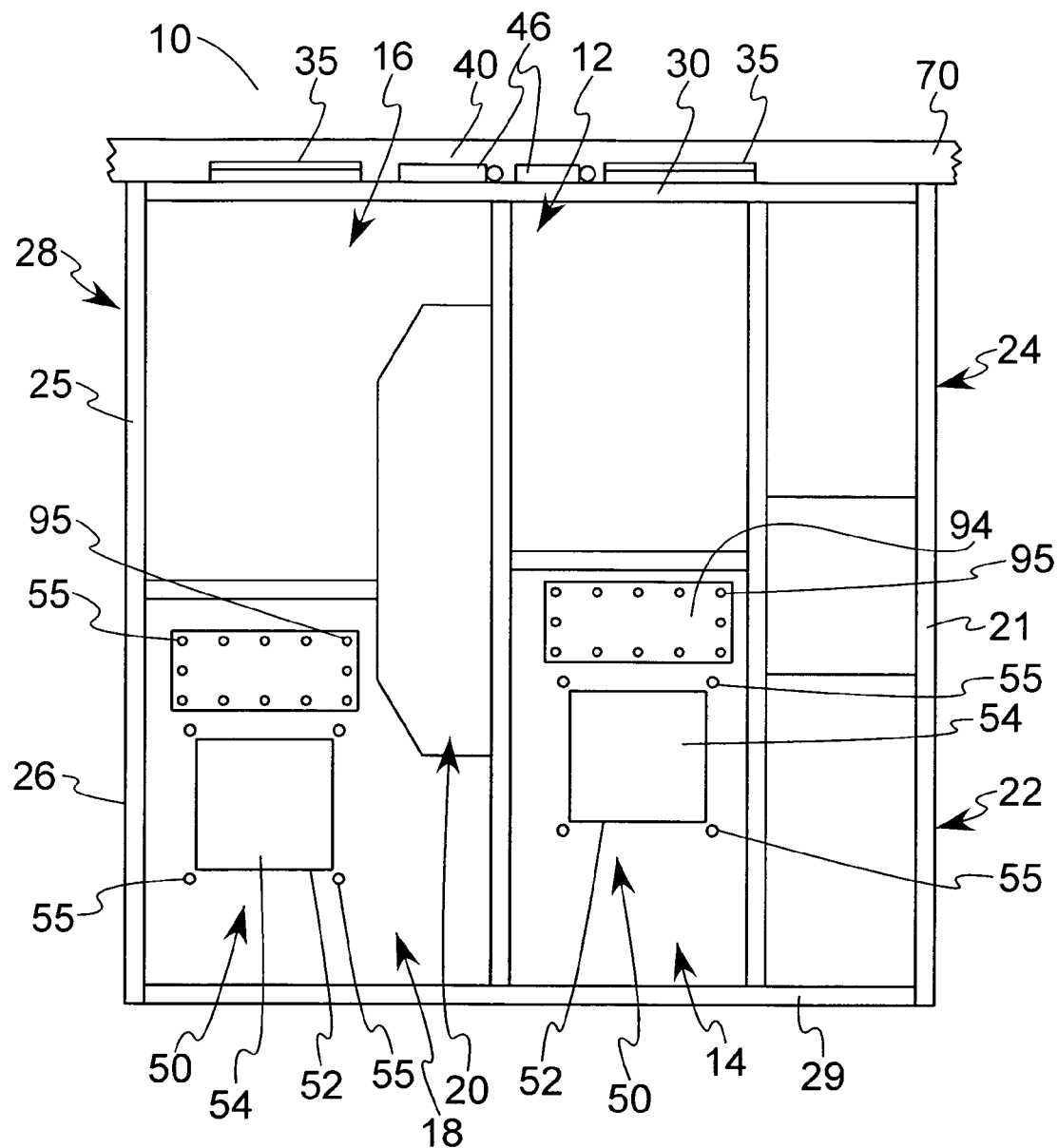
FIG. 1 is a vertical sectional view of an arc resistant switchgear assembly made in accordance with the present invention taken from the side of the assembly showing a schematic of the interior thereof, the front of the assembly being on the right.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Having reference to the drawings, attention is directed first to FIG. 1 which discloses a vertical sectional view of an arc resistant switchgear assembly made in accordance with the present invention taken from the side of the assembly showing a schematic of the interior thereof designated generally by the numeral 10. As shown, it may be appreciated that the front of the assembly 10 is on the right. In comparing FIGS. 1 and 2, it will be appreciated that the arc resistant switchgear assembly 10 of this invention resembles some prior art switchgear assemblies in that it has a first front cubicle or breaker compartment 12, a second front cubicle or breaker compartment 14, a first rear cubicle or breaker compartment 16, a second rear cubicle or breaker compartment 18, and a main bus compartment 20. It is due to the fact that because so much of the breaker assembly of this invention incorporates structure already well known in the art, that fabrication and installation of this assembly would be relatively easy.

The arc resistant switchgear assembly of this invention also resembles some prior art switchgear assemblies in that it has a front exterior wall 21 having a first front door 22 and a second front door 24, a rear exterior wall 25 having a first rear door 26 and a second rear door 28, a floor or bottom surface 29, and a top wall or upper surface 30. Further, just like other prior art switchgear assemblies, the assembly of this invention has a plurality of relief flaps 35 resting on the upper surface 30 of the assembly covering openings in the top wall 30, with these flaps 35 being secured to the upper surface 30 by hinge member 37. Further, above top surface 30 is a horizontal collector plenum 40.

Figure 2:
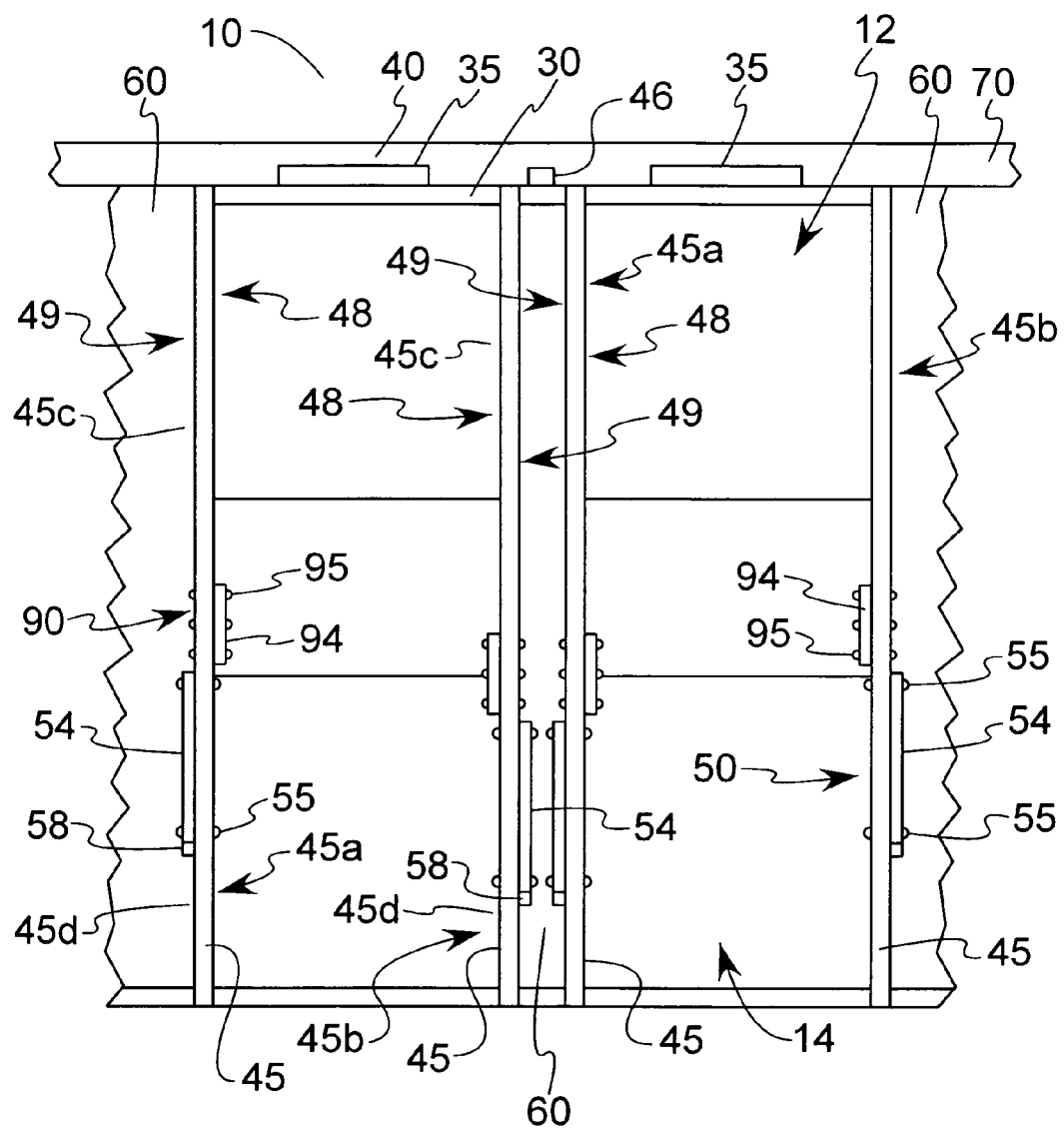
FIG. 2 is a vertical sectional view taken from the front of the assembly showing a schematic of the interior thereof.
Figure 3:
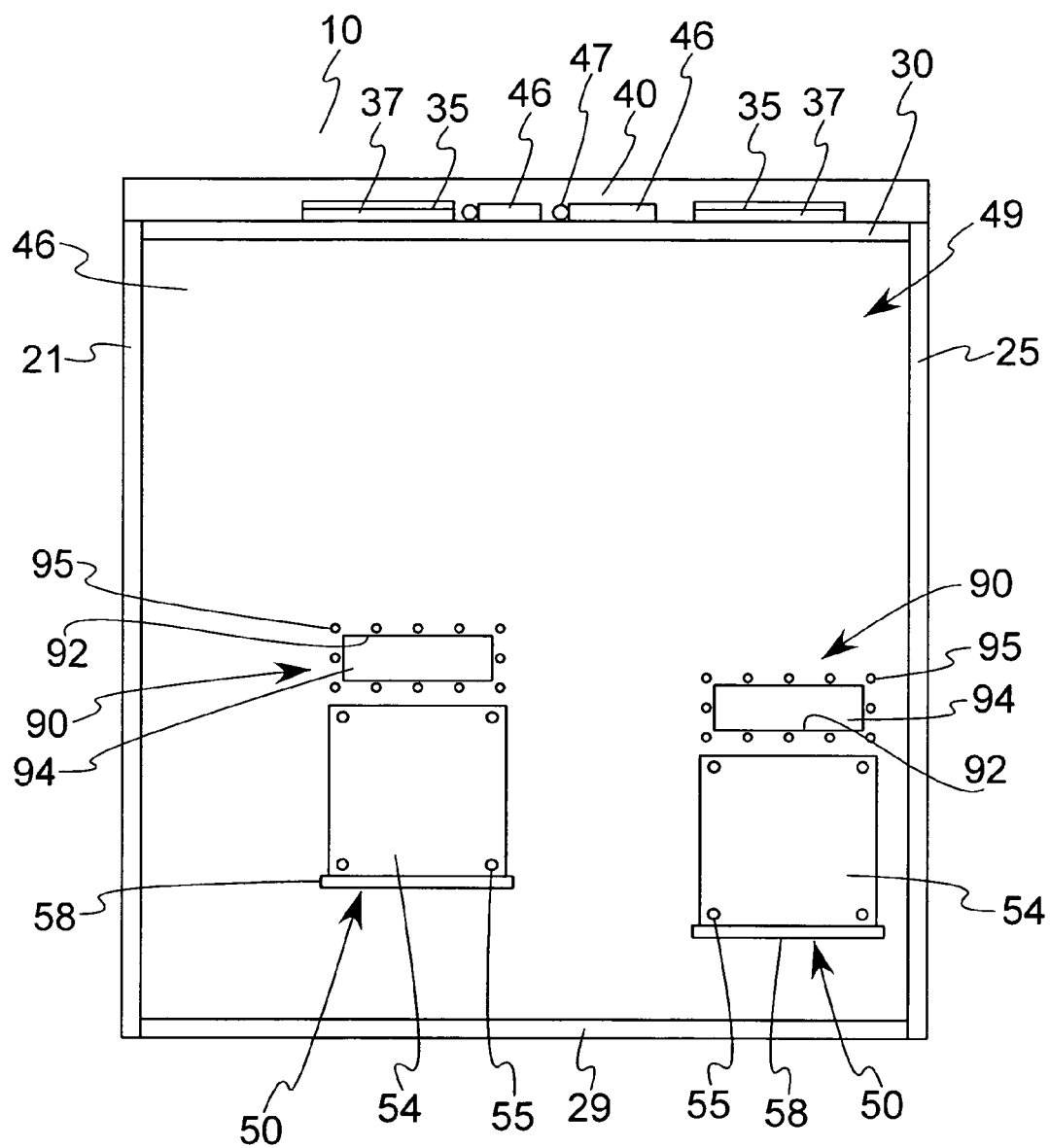
FIG. 3 is a vertical sectional view taken from the other side of the sidewall shown in FIG. 1, such that the front of the assembly is on the left.

While the switchgear assembly 10 bears many similarities to prior art switchgear, the invention primarily resides in the unique features and construction associated with the side walls 45, as can best be appreciated from a comparison of FIGS. 1-3. Although the two side walls 45a,45b associated with each cubicle are spaced a first distance apart to enable the placement therebetween of appropriate electrical hardware found in switchgear, each side wall 45 has a first surface 48 that serves as the interior surface of a breaker compartment, and a second surface 49 that serves as the interior surface of the unique vertical plenum 60 associated with this invention.

One of the unique and noticeable features of each sidewall 45 is the blow-out device 50 associated therewith. The blow-out device 50 includes a blow-out aperture 52 and a blow-out panel 54, both being shown as generally rectangular in shape, although the exact shape is not believed to be critical. Once the blow-out panel is installed in its operative position, the actual blow-out aperture 52 can only be seen when looking at the first surface 48, since the blow-out panel 54 overlays it within the vertical plenum itself.

The blow-out panel is detachably held in position against the second surface 49 of the side wall 45 by a connector or fastener having characteristics similar to the Christmas tree clip fastener of Volt Industrial Plastics, in that the shaft of the fastener has a plurality of thin flanges projecting outwardly therefrom, these flanges being deformable upon the application of substantial force to enable the object attached using this type of fastener or one similar thereto to be readily detached. Other non-metallic clips or fasteners 55 that would perform in a similar way could be used, with such fastener being made from plastics, nylon, or other synthetic materials well known in the art of making such prior art fasteners.

Since most switchgear have breakers in their lower cubicles, it will be appreciated that the blow-out devices of this invention are preferably located in the lower portion 45d of the switchgear side walls 45 (not the upper portion 45c), with this lower portion 45d understood as being in the lower half of each side wall. In installing each of panel 54 in its operative position, the fasteners are installed from inside the respective cubicle, for reasons that will be discussed below in connection with the dissipation of exhaust.

As can best be appreciated from a comparison of FIGS. 2 and 3, a support shelf 58 is secured by welding or other appropriate means just below the operative position of the blow-out panel 54, to enable the panel to rest upon the support shelf 58 instead of causing the weight of each panel 54 to be borne by the fasteners 55. The actual dimensions of the support shelf are not believed to be critical, only that adequate support can be provided to prevent the premature detachment of the panel 54 from the fasteners 55.

The vertical plenum 60 associated with this invention preferably has its structure defined by the front exterior wall 21, the rear exterior wall 25, the bottom surface 29 and top surface 30, along with a pair of opposed side walls 45. The width of the vertical plenum which corresponds to the distance between the second surfaces 49 of opposed side walls 45 is less than the first distance, and is in the range of 4-18" and more preferably in the range of 6-10". In the most preferred embodiment of the invention the gap between the side walls of the vertical plenum is 6", such that adjacent cells within the switchgear are separated by only 6". The upper surface in the vertical plenum has plenum relief flaps 46 resting over openings in the top of the vertical plenum, and secured to the top surface by hinge member 47. The area associated with these plenum relief flaps 46 is less than the area associated with the relief flaps 35. The horizontal collector plenum 40 is preferably of a height that is greater than the width of the vertical plenum, with that height being approximately 2'.

The side walls 45 also include service hand-holes 90 which include a service aperture 92 and a service panel or plate 94. Once again the service aperture and service panel which overlays it are shown as being rectangular, but their shape are not critical. The service panels are secured by connectors or fasteners 95 to the first surface 48 of the side wall 45. As opposed to the type of fastener used to secure the blow-out panel to the second surface 49 of the side wall 45, the fasteners 95 used to secure the service panel to the first surface of the side wall 45 preferably are of the type having a threaded metal shaft to provide a stronger securing of the service panel to the side wall than is associated with the blow-out panel 54.

Figure 4:
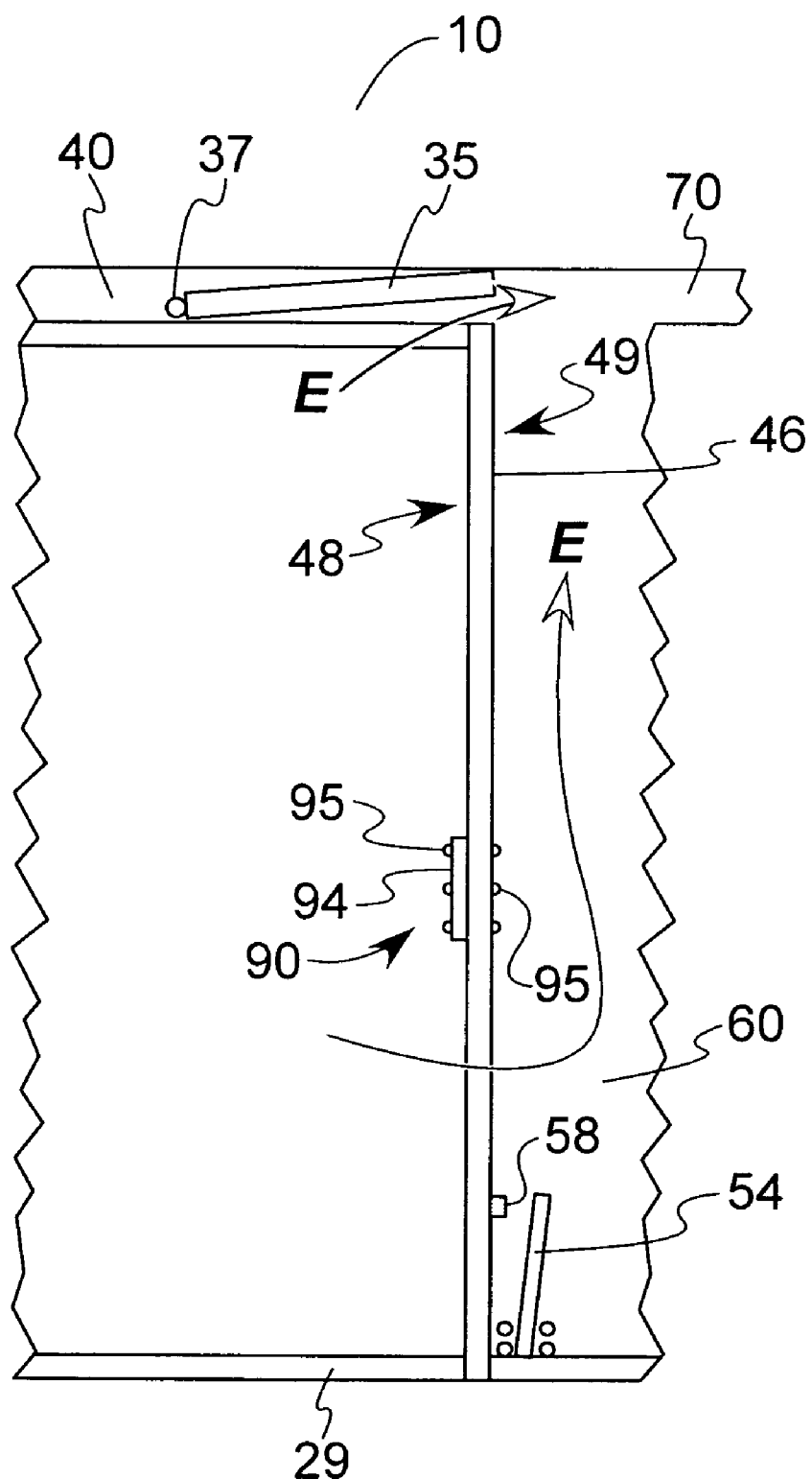
FIG. 4 is a partial vertical sectional view similar to a portion of FIG. 2, but showing the effect of an explosion on the arc resistant switchgear assembly of the invention.

In actual use, the arc resistant switchgear associated with this invention provides a larger exhaust area, since exhaust from an explosion due to arcing can be dissipated through the relief flaps 35 as well as through the blow-out panels 54 as can best be seen in FIG. 4. The presence of a larger exhaust area results in the ability to more quickly lower the pressure within the switchgear housing.

Additionally, in the arc resistant switchgear of this invention, the blast exhaust can also escape through both opposing side walls of the compartment in which any blast occurs, with this exhaust E then flowing into the horizontal collector plenum 40, which is preferably a steel reinforced plenum, and which horizontal collector plenum is ultimately connected to ductwork 70 or exhaust conduit (not shown completely from the horizontal connector plenum to the terminus of such conduit) of the type well known in the prior art, which ductwork or exhaust conduit then terminates outside the building where the switchgear 10 is physically located. This horizontal collector plenum is approximately 2' high and extends across the roof of the switchgear. The horizontal collector plenum contains the exhaust from a blast that initially passes through one or more vertical plenums and/or passes upwardly through one or more vent flaps 35. Another advantage associated with this invention, is that in the unlikely event that one blow-out panel fails to detach from its side wall, there is a redundant path provided into a vertical plenum by the presence of a blow-out panel on the opposite side wall.

As a result of the characteristics of the structure of the invention, an arc resistant switchgear is provided which can efficiently enable the relatively quick dissipation of the exhaust of an explosion caused by arcing. As a result of the dimensioning of this invention, the footprint associated with this device makes it easier to maximize the amount of kilowatts that can be generated per square foot. This is especially true with the ability to stack one cubicle on top of another. Plus, the footprint associated with this assembly permits other equipment to be installed in the space that other prior art assemblies would require to house just their switchgear assemblies.

Moreover, in actual use, should an explosive blast occur which detaches the blow-out panels from one or more of the side walls, the service panel just above each now-open blow-out aperture can be detached from the side wall thereby permitting a worker to reach down into the plenum and retrieve the blow-out panel so that it can be reused if possible and reattached to the side wall using the deformable fasteners 55. By potentially enabling the switchgear to be repaired on site can save a substantial amount of money and/or preserve the amount of generating ability associated with the switchgear. Finally, to further preclude any gas passage from leaking from the switchgear in the event of an explosion, a silicone caulk seal is applied around all metal joints, in lieu of a much more expensive weld construction used by some prior art devices in an attempt to accomplish the same objective.

While the form of apparatus herein described constitutes a preferred embodiment of the present invention, it is to be understood that the invention is not limited to this precise form of apparatus and that changes may be made therein without departing from the scope of the invention which is defined in the appended claims.

What is claimed is:

1. An arc resistant switchgear assembly comprising a front wall, a rear wall, a bottom surface, an upper surface, a first side wall, and a second side wall opposed to said first side wall and spaced a first distance from said first side wall, each of said first and second side walls having an upper portion and a lower portion, each of said first and second side walls having an inner and an outer surface, at least the lower portion of one side wall having a blow-off panel detachably secured thereto by fastening means, said panel being detachably secured to said outer surface of said one side wall, said assembly including a blow-off panel support shelf, said shelf being secured to said outer surface of said one side wall below and adjacent to said blow-off panel, said blow-off panel in contacting relationship with said blow-off panel support shelf, said assembly having a vertical plenum formed directly adjacent said one side wall, said outer surface of said one side wall defining the inner side wall of said vertical plenum, said vertical plenum extending upwardly and connecting to a horizontal collector plenum, said vertical plenum being of a width less than said first distance.

2. The switchgear assembly according to claim 1 wherein said fasteners for detachably securing said blow-off plates to said side wall are non-metallic.

3. The switchgear assembly according to claim 2 wherein said fasteners are nylon.

4. The switchgear assembly according to claim 1 wherein said horizontal collector plenum is above said upper surface.

5. The switchgear assembly according to claim 1 wherein said front wall, rear wall, first and second side walls, bottom surface and upper surface are of metal.

6. The switchgear assembly according to claim 1 wherein said upper surface has at least one relief flap resting thereon, said upper surface relief flap being hingedly connected to said upper surface.

7. The switchgear assembly according to claim 1 wherein said horizontal collector plenum is connected to exhaust ductwork.

8. The switchgear assembly according to claim 1 wherein at least the lower portion of both said first side wall and said second side wall has at least one blow-off panel detachably secured thereto by fastening means, each of said panels being detachably secured to said outer surface of the side wall to which each is secured, said assembly having a vertical plenum formed directly adjacent both said first and second side walls, said outer surface of each of said first and second side walls defining an inner side wall of each of said vertical plenums.

9. The switchgear assembly according to claim 8 wherein said vertical plenum has a width in the range of 4-18".

10. The switchgear assembly according to claim 9 wherein said vertical plenum has a width in the range of 6-10".

11. The switchgear assembly according to claim 8 wherein said fasteners for detachably securing said blow-off plates to said side walls are non-metallic.

12. The switchgear assembly according to claim 8 wherein said fasteners are nylon.

13. The switchgear assembly according to claim 8 wherein said horizontal collector plenum is above said upper surface and said upper surface has at least one relief flap resting thereon, said upper surface relief flap being hingedly connected to said upper surface.

14. The switchgear assembly according to claim 8 which includes a blow-off panel support shelf, a support shelf being secured to said outer surface of said first side wall and said second side wall below and adjacent to said blow-off panels, each of said blow-off panel in contacting relationship with said blow-off panel support shelf adjacent thereto.

15. The switchgear assembly according to claim 8 which includes a service hand-hole located above each of said blow-off panels, each said service hand-hole having a service aperture and a service panel, each said service panel being secured to the inner surface of said side wall to which the blow-off panel is attached.

16. An arc resistant switchgear assembly comprising a front wall, a rear wall, a bottom surface, an upper surface, a first side wall, and a second side wall opposed to said first side wall and spaced a first distance from said first side wall, each of said first and second side walls having an upper portion and a lower portion, each of said first and second side walls having an inner and an outer surface, at least the lower portion of both said first side wall and said second side wall has at least one blow-off panel detachably secured thereto by fastening means, each of said panels being detachably secured to said outer surface of the side wall to which each is secured, said assembly having a vertical plenum formed directly adjacent both said first and second side walls, said outer surface of each of said first and second side walls defining an inner side wall of each of said vertical plenums, said outer surface of said first side wall defining the inner side wall of one of said vertical plenums and said outer surface of said second side wall defining the inner side wall of an adjacent vertical plenum, each of said vertical plenums extending upwardly and connecting to an exhaust conduit, each said vertical plenum being of a width less than said first distance, said assembly including a service hand-hole located above said blow-off panel, said service hand-hole having a service aperture and a service panel, said service panel being secured to the inner surface of said one side wall.

17. An arc resistant switchgear assembly comprising a front wall, a rear wall, a bottom surface, an upper surface, a first side wall, and a second side wall opposed to said first side wall and spaced a first distance from said first side wall, each of said first and second side walls having an upper portion and a lower portion, each of said first and second side walls having an inner and an outer surface, at least the lower portion of one side wall having a blow-off panel detachably secured thereto by fastening means, said panel being detachably secured to said outer surface of said one side wall, said assembly having a vertical plenum formed directly adjacent said one side wall, said outer surface of said one side wall defining the inner side wall of said vertical plenum, said vertical plenum extending upwardly and connecting to a horizontal collector plenum, said vertical plenum being of a width less than said first distance, said assembly including a service hand-hole located above said blow-off panel, said service hand-hole having a service aperture and a service panel, said service panel being secured to the inner surface of said one side wall.

* * * * *